G. H. CLARKE.
Bee Hive.
No. 14,051. Patented Jan. 8, 1856.
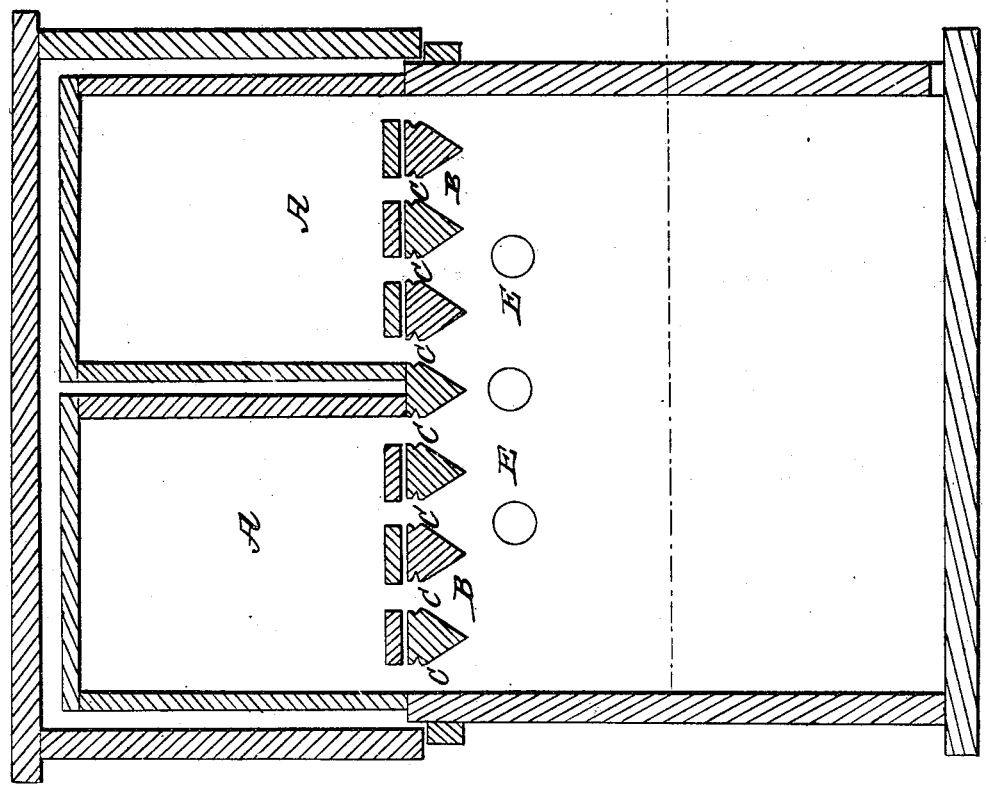

UNITED STATES PATENT OFFICE.

GEO. H. CLARKE, OF EAST WASHINGTON, NEW HAMPSHIRE.

BEEHIVE.

Specification of Letters Patent No. 14,051, dated January 8, 1856.

*To all whom it may concern:*

Be it known that I, GEO. H. CLARKE, of East Washington, in the county of Sullivan and State of New Hampshire, have invented certain new and useful Improvements in Beehives; and I do hereby declare that the following is a full and exact description thereof, reference being had to the accompanying drawings and to the letters of reference marked thereon.

The nature of my invention consists in the application of three or more open-sided hollow bars or tubes, the leading object of which is to afford, at all times, a safe and easy mode of inter-communication between all the combs in the hive, another effect of these hollow bars or tubes being to support the comb; and to enable others skilled in the mechanic arts to make and use my invention I will proceed to describe its construction and operation.

Figure 1 of the annexed drawing is an elevated section, the front being removed; and Fig. 2 is an end view of the hollow bars, their lateral position being represented by the dotted lines.

I make my hive in two sections, the lower section containing the bees with their brood-combs and winter store, the upper section containing the boxes marked A, Fig. 1, for receiving the surplus honey. The top of the lower section is composed of seven or eight bars of a peculiar form, as seen at B, Fig. 1. These bars extend across the hive from front to rear and are one inch wide on the top and seven eighths of an inch deep. The perpendicular sides of the bars are $\frac{1}{4}$ of an inch wide, the remainder of the depth being beveled, as shown at B, thus forming a sharp edge at the lower center of the bar. These bars are so placed as to leave spaces between them and between them and the sides of the hive of about $\frac{7}{16}$ of an inch and a gage point is run in the sides of each bar, as seen at C, C, Fig. 1. This gage line supplies the bees with an excellent means of suspending themselves by the little hooks on their feet, thus supporting the mass of bees while they are commencing to build their combs.

Apiarists who have understood the great advantages of having the hive well filled with brood-combs have tried by various methods to make the bees fill the hive with brood combs, so as to produce the greatest possible increase of bees. Bars of different forms have been adopted; but no certainty or uniformity has ever been attained by these efforts, the bees in the vast majority of cases doing just as they pleased, irrespective of the directions thus given them, and many beekeepers, after a series of such unsuccessful experiments, have abandoned the idea, thinking it impossible to devise a bar that will be a sure guide and warrant success in all cases. Others have constructed bars which, joined to a certain course of management which must be perfectly understood by the manager, have caused the bees to build straight and parallel combs. Those experimentalists say themselves that persons unacquainted with their peculiar process would not be able to prevent the bees from working on the top of the hive between the bars, and thus upset all their designs, and if they put on no top the bees will ascend and work in the cap first, which also destroys the end they have in view. Some additional guide, then, was wanting to prevent the bees from filling the boxes at the same time they do the lower section of the hive, however large the swarm may be, and the bars in my hive effect that desirable object. When the bees are hived, they quickly ascend the walls of the hive to the bars and cluster along on them from one end to the other. They here find the most abundant facilities for clustering by hitching the little hooks on their feet into the gaged line on the sides of the bars, as seen at C, C, C, and as this is the only place given them from which they can suspend themselves they, with that precision and order which instinct always exhibits, lay hold of this line and commence their work in good earnest. As the spaces between the bars are only $\frac{7}{16}$ of an inch wide there is no other convenient place for them to work than that which the gage line points out. The bees assume the same position on every bar and simultaneously carry down the comb to the bottom of the hive. By this arrangement, the whole swarm having a chance to work, a hive of ordinary dimensions can be filled in one half the time it would take without these appliances, and the bees have thus a chance to fill the boxes much sooner than in any other hive.

Having thus explained the bars from which the comb is suspended, I will now give a description of the double-acting hollow bars marked D, Fig. 2, which I place across the hive from right to left. These bars or tubes are of the greatest importance, because they afford the means of reaching sustenance, and thereby prolonging life among the bees under circumstances which no other known means can afford. Three of these bars I deem sufficient in a common sized hive. Their construction is simply a tube with a lateral opening, that opening being turned downward when they are in position in the hive for the following cogent reasons: first, to afford the strongest support to the comb; second, to keep them from being filled with dirt made by the bees, and, third, because it best affords to the bees the unobstructed passage through all of their combs, thus connecting them from one side of the hive to the other. When the bees have built comb down to the hollow bars they fasten it tight to the top side, and carrying it down on both sides join it underneath, but do not build up into the hollow. The beneficial results of these hollow bars as I use them are the following: first, they act as supports to the comb, in the same manner as solid bars in a common old-fashioned box-hive; second, they afford a convenient and free passage from comb to comb at all times and under all circumstances. Apiarists in cold climates know that in winter a part of all of a swarm will often be found starved, while at the same time there is plenty of honey in the hive, for when the weather is very cold the bees cluster snugly together toward the center of the hive, and after they have eaten out the honey there—the weather still remaining intensely cold—they must starve, for they cannot uncluster to pass across broad ranges of comb and get around to that part of the comb containing honey without being chilled to death, and indeed they never attempt to do this while the weather is so cold as to prevent their moving in safety, and the queen being always found in the place containing the largest number of bees there they will eat up the honey first, and then if they cannot move to a place supplied with honey or be supplied with it where they are they must certainly starve. If the rest of the swarm live on one or both sides of the place where they have died, even these are worthless, because they have lost their queen and can do nothing without her. But when the hive contains several of these hollow bars the queen will be found among the last living, unless she dies of disease or old age. The bees will always be found clustered around these bars, through which they may safely and quickly pass without being chilled, as they would be if they were compelled to travel over wide sheets of comb to get around the edge. But by the use of these bars if they do not remove they can be supplied with honey by the bees from those places containing it, for, while the bees are clustered around these bars, other bees can pass through them without being in the least exposed to the cold, and thus a constant intercommunication is kept up among the bees during the severest weather. Nor is this the end of the benefit derived from my invention. Early in the spring in all large swarms that are well supplied with honey and bread the queen commences to deposit her eggs in that portion of the comb covered by the bees, and having made her deposits in all the cells so covered in one range of comb she is, by this passage, at perfect liberty to pass through and continue her labors on all the other ranges, and by this means thousands of bees are bred and brought to maturity in advance of the time occupied in laying the eggs in any other hive, and they will swarm from a week to a fortnight earlier in my hive than in any other hive of the same dimensions. Not only do they swarm earlier, but they make more box honey, and become sufficiently numerous to work in the boxes by the time that honey is plenty in flowers, and, swarming as they do early, the first swarm has the opportunity to fill the lower section full for winter provision and make in boxes from twenty to fifty pounds of nice honey for future use. In my hive the second and third swarms have the same advantages for laying up their winter store that first swarms have in other hives; but in ordinary hives, having no passage through the comb, after the queen has laid her eggs in all the cells on the sides of the comb in the space where she is, then she is obliged to drop her eggs to the bottom of the hive, however prolific she may be. Eggs so dropped are all lost, and until the weather becomes warm enough to allow the bees to spread to the edge of the comb the queen will not leave them to go around alone. This caution is a preserving instinct, for should she attempt to go around in cold weather she might be chilled on the way or lose her hold and fall to the bottom, and there be chilled to death, and every beekeeper knows, or ought to know, that a bushel of bees are worthless without a queen.

The boxes A in the upper section of my hive may have a glass placed in each end, through which may be noticed the operations of the bees when the cap is removed. When these boxes are placed in proper position, the bars or slats in them being immediately over bars B, Fig. 1, the bees have then an easy and large access, and having all the room between the combs in the lower section for a passageway up it is impossible for them to miss their way between the bars into the boxes, let them creep up where they will, and but a moment is required to enable the bee which has entered the hive to be safely up in the boxes. Whereas in hives where they have only a few auger holes for a passage up into the boxes it takes the bees nearly half a day of wandering among the comb before they can find a place of entrance to the boxes. Therefore in such defective hives the bees will store their honey in the lower section as long as they can find a place and in this way the bees often infringe upon the rights of the queen by filling up the broad comb so much that she has no place to deposit her eggs. They must then be dropped to the bottom of the hive, and thus it is that the bees not only waste most of their time when honey is plenty in the flowers, but lose a great increase in their numbers.

All those difficulties which I have pointed out in ordinary hives I obviate by the devices which I apply and which I have endeavored, it may be imperfectly, to describe.

My hive may be ventilated in any way most convenient. I have ventilated by means of three small holes, as represented at E, E, Fig. 1.

For the purposes of examination, a square of glass may be placed in the back of the hive.

Disclaiming the other devices described, individually or combined, what I claim is—

The construction and arrangement of the hollow bars D, in the manner and for the purposes set forth.

GEORGE H. CLARKE.

Witnesses:
TIMO. HOSKINS,
WAKEMAN J. POWERS.